(12) United States Patent
Paris

(10) Patent No.: US 11,433,740 B2
(45) Date of Patent: Sep. 6, 2022

(54) AIR VENT

(71) Applicant: FAURECIA INTERIEUR INDUSTRIE, Pierreux (FR)

(72) Inventor: Jerome Paris, Livry-Gargan (FR)

(73) Assignee: FAURECIA INTERIEUR INDUSTRIE, Pierreux Nanterre (FR)

( * ) Notice: Subject to any disclaimer, the term of this patent is extended or adjusted under 35 U.S.C. 154(b) by 10 days.

(21) Appl. No.: 16/909,230

(22) Filed: Jun. 23, 2020

(65) Prior Publication Data
US 2020/0406721 A1 Dec. 31, 2020

(30) Foreign Application Priority Data

Jun. 28, 2019 (DE) ...................... 10 2019 209 515.1

(51) Int. Cl.
*B60H 1/34* (2006.01)
*B60H 1/00* (2006.01)

(52) U.S. Cl.
CPC ....... *B60H 1/3421* (2013.01); *B60H 1/00564* (2013.01); *B60H 1/00671* (2013.01); *B60H 1/00871* (2013.01); *B60H 2001/00721* (2013.01)

(58) Field of Classification Search
CPC .............. B60H 1/3421; B60H 1/00564; B60H 1/00671; B60H 1/00871; B60H 2001/00721
USPC ........................................................ 454/155
See application file for complete search history.

(56) References Cited

U.S. PATENT DOCUMENTS

2014/0357179 A1\* 12/2014 Londiche .............. F24F 13/075
454/322

FOREIGN PATENT DOCUMENTS

| DE | 102017111011 A1 | 7/2017 |
| DE | 102016116358 A1 | 3/2018 |
| DE | 102018110093 A1 | 8/2019 |

OTHER PUBLICATIONS

"German Application Serial No. 10 2019 209 515.1, Search Report dated Apr. 14, 2020", (Apr. 14, 2020), 7 pgs.

\* cited by examiner

*Primary Examiner* — Allen R. B. Schult
(74) *Attorney, Agent, or Firm* — Schwegman Lundberg & Woessner, P.A.

(57) ABSTRACT

Disclosed is an air vent comprising a housing configured to guide an air flow from an air inlet to an air outlet, an air guide arranged at least partly within the housing such that the air guide and the housing define a first air channel and a second air channel, a regulating flap arranged between the air inlet and the air guide, configured to regulate a ratio between a first partial air flow through the first air channel and a second partial air flow through the second air channel, a first and second shutoff element arranged at least partly within the housing. The first shutoff element is configured to shut off the first partial air flow without shutting off the second partial air flow and the second shutoff element is configured to shut off the second partial air flow without shutting off the first partial airflow.

20 Claims, 1 Drawing Sheet

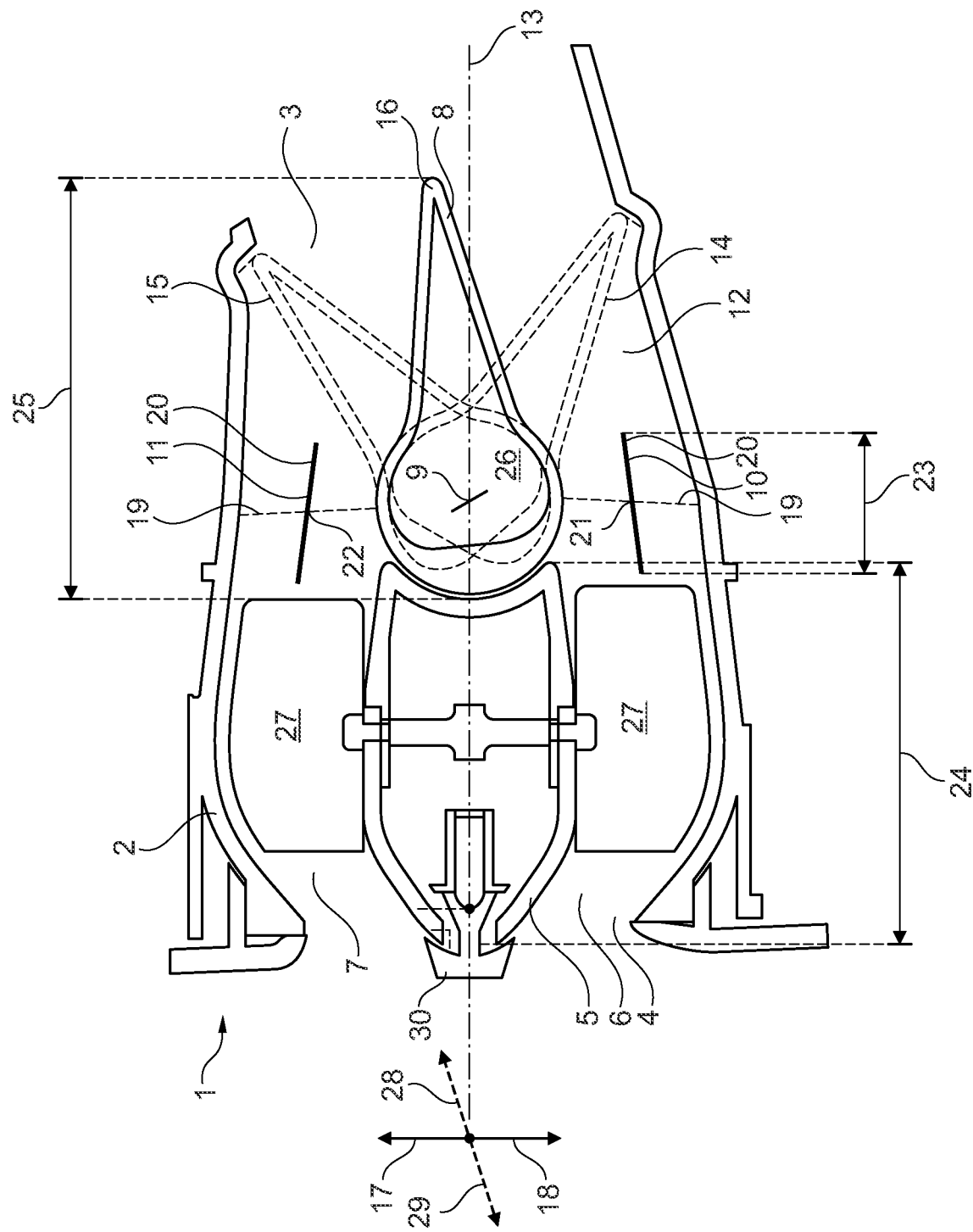

AIR VENT

CLAIM FOR PRIORITY

This application claims the benefit of priority of German Application No. 10 2019 209 515.1, filed Jun. 28, 2019, which is hereby incorporated by reference in its entirety.

TECHNICAL FIELD

The disclosure concerns an air vent, particularly an air vent for a vehicle. An air vent of the type described herein comprises a housing configured to guide an air flow from an air inlet to an air outlet as well as various components configured to guide the air flow and regulate, for instance, the flow rate and/or directionality of the air flow.

BACKGROUND

Numerous examples of air vents are known in the art. In many cases, spatial constraints need to be taken into account when considering the placement of air vents. In particular, the available space for air vents in dashboards, center consoles, ceilings, pillars, door modules, or similar interior elements of a motor vehicle may be highly limited. Accommodating the various components of the air vent for guiding and regulating the air flow may make the air vent too large to easily fit into the available space.

SUMMARY/OVERVIEW

Consequently, a problem to be solved by the present disclosure is to provide an air vent with a compact housing.

An air vent of the kind proposed here comprises a housing configured to guide an air flow from an air inlet to an air outlet, an air guide arranged at least partly within the housing such that the air guide and the housing define a first air channel and a second air channel, a regulating flap arranged between the air inlet and the air guide, configured to pivot around a first pivot axis to regulate a ratio between a first partial air flow through the first air channel and a second partial air flow through the second air channel, a first shutoff element arranged at least partly within the housing, and a second shutoff element arranged at least partly within the housing.

The first shutoff element is configured to shut off only the first partial air flow without shutting off the second partial air flow and the second shutoff element is configured to shut off only the second partial air flow without shutting off the first partial airflow.

The interior of the housing defines a cavity. The air inlet and the air outlet are openings in the housing configured to fluidly connect the cavity with surrounding air. The air inlet and the air outlet may be diametrical or nearly diametrical with respect to one another, whereby a central axis is defined as a connecting line from the center of the air inlet to the center of the air outlet, if the housing is mirror-symmetric. If the housing deviates slightly from a mirror symmetric arrangement, a central axis can still be defined by choosing an axis extending approximately through the center of the housing from the air inlet to the air outlet. A direction parallel to the central axis is referred to as the axial direction.

The air inlet may be connectable or connected to an air duct. The air duct may be part of an HVAC (heating and/or ventilation and/or air conditioning) system. The HVAC system may be an HVAC system of a motor vehicle. The air duct may be configured to cause an air flow through the cavity, e.g. by being fluidly connected to a central unit of the HVAC system.

The air outlet may be configured to allow for the cavity to be fluidly connected with, for instance, a space in the interior of a motor vehicle or any other space where a discharge of air is desired. The air outlet may be configured to allow for a discharge of the air flow into said space when the air inlet is connected to the air duct of the HVAC system.

The air guide may be a rigid body mounted in a fixed position with respect to the housing. It may be fully or partially contained within the cavity. Spaces between the housing and the air guide on opposite sides of the air guide define the first air channel and the second air channel. A plane containing the central axis and arranged such that it lies substantially between the first air channel and the second air channel is referred to as a central plane.

The regulating flap may be a rigid body mounted pivotably (around the first pivot axis) between the air inlet and the air guide. The regulating flap may comprise non-rigid parts, for example for sealing. The regulating flap is mounted in the cavity between the air inlet and the air guide. The first pivot axis may lie within the central plane and be perpendicular to the central axis.

The regulating flap may be configured to regulate the ratio between the first partial air flow and the second partial air flow by pivoting towards directions perpendicular to the central plane such that one of the first and second air channel are at least partially obstructed when viewed from the air inlet. The regulating flap may be configured to pivot to a first extreme position, in which the first air channel is fully obstructed, and to a second extreme position, in which the second air channel is fully obstructed.

The regulating flap may be configured to be pivotable to a neutral position, the first partial air flow and the second partial air flow are equal, i.e. have equal flow rates in case the two air channels do not have distinct obstructions for the air flows. If the housing is symmetrical about the central axis, the regulating flap may be aligned along the axial direction when in the neutral position.

The first air channel may be configured to guide the first partial air flow such that it is discharged through the air outlet towards a first direction; the second air channel may be configured to guide the second partial air flow such that it is discharged through the air outlet towards a second direction that is different from the first direction. More in particular, the first air channel and the second air channel may be configured such that an air outlet flow of the first air channel collides with an air outlet flow of the second air channel. Regulating the fractions of the air flow that make up the first and/or second partial air flow may then regulate a net discharge direction of the air flow discharged through the air outlet.

The first and second air channel, while defined by the spaces between the housing and the air guide, may also include spaces between the housing and the regulating flap, which spaces enlarge the first and second channel in the direction of the air inlet.

The first and second shutoff element are movable elements configured to be movable to a shutoff position, in which the respective partial air flow is shut off or minimal, and an open position, in which the respective partial air flow is maximal. In addition, the first and second shutoff element may be configured to regulate the flow rate of the first and second partial air flow, respectively, to assume different intermediate values by moving the shutoff element to positions between the shutoff position and the open position. The first and second shutoff element may be movable independently or jointly.

The first and second shutoff element being configured to shut off only the first and second partial air flow, respectively, allows for shutoff of the two partial air flows without using a single, central shutoff element. This allows for a flexible placement of the shutoff elements and a correspondingly compact housing.

For instance, the first shutoff element may be arranged at least partly within the first air channel. The second shutoff element may be arranged at least partly within the second air channel.

In this manner, it is not necessary to place the shutoff element or shutoff elements either fully between the regulating flap and the air inlet or fully between the air guide and the air outlet, thereby allowing for a particularly compact housing along the axial direction.

The first and second shutoff elements may be or comprise pivotable vanes, the first shutoff element being pivotable around a second pivot axis and the second shutoff element being pivotable around a third pivot axis.

Such pivotable vanes may be flat, rigid bodies. At least one of the second or third pivot axis may be a hinge-like structure arranged at a wall of the housing, at the air guide, at the regulating flap, or elsewhere at a rigid part of the housing, with an end portion of the corresponding shutoff element pivotably mounted to the pivot axis. Alternatively, the pivot axes may be rods or spindles that traverse the housing, with one or two end portions of each rod or spindle being affixed to the housing and a center portion of the corresponding shutoff element pivotably mounted thereto.

Using pivotable vanes as shutoff elements may have the advantage that they allow for an efficient shutoff and numerous ways to actuate or manipulate such vanes are known in the art.

The second pivot axis may be parallel to the third pivot axis in order to allow a similar movement of both shutoff elements. In an example, the second and third pivot axis may be perpendicular to the first pivot axis. In another example, the first pivot axis may be parallel to the second and/or third pivot axis.

Arranging the pivot axes in such ways allows for favourable constructive arrangements of the movable parts (shutoff elements, regulating flap) such that they may be actuated or manipulated by robust and user-friendly control elements. For instance, a single manipulator could be used to control said movable parts.

Alternatively to being pivotable vanes, the first and second shutoff elements may be other types of shutoff elements, e.g. sliding or bending closure elements. At least one of the shutoff elements may comprise more than one vane, for instance, at least one of the shutoff elements may comprise a plurality of pivotable vanes configured to pivot jointly. A plurality of vanes may be advantageous in case the shutoff element is used for directing the air flow towards a direction that is parallel to the direction of the first axis. Multiple vanes pivotable around an axis that is perpendicular to the first pivot axis may in particular be preferred.

In an example in which the first, second and third pivot axis are parallel, these axes may be arranged such that a straight line perpendicular to the first pivot axis crosses both the second and the third pivot axis. An advantage of such an arrangement is that a very compact construction is possible, meanwhile leaving sufficient space in between the housing and the air guide for additional air regulating elements such as vanes for directing the air flows.

At least one of the shutoff elements, more in particular one of the vanes, may have a first length perpendicular to its pivot axis, the air guide may have a second length along the axial direction of the housing, and the regulating flap may have a third length perpendicular to the first pivot axis. The first length may be less than the second length and/or less than the third length.

Choosing the first length to be shorter than the second and/or third length may allow for a particularly compact housing by leaving space within the first and/or second air channel for additional regulating elements, e.g. directional vanes. For example, the first length may be less than two thirds of the second or third length, less than half of the second or third length, or less than one third of the second or third length, chosen according to the placement of the shutoff elements and additional regulating elements. In particular, this tuning of the dimensions allows the air flows to be regulated and/or directed in an efficient and effective way.

At least one of the shutoff elements may at least partially overlap the regulating flap and/or the air guide along the axial direction.

Such a way of arranging at least one of the shutoff elements allows for an efficient use of space, especially any otherwise unused space within the partial air channels, contributing to a particularly compact housing.

The regulating flap may have a tapered or droplet-like shape with a thicker end oriented towards the air guide.

Such a shape may have favorable air guiding/air flow properties.

At least one of the shutoff elements may be configured to abut or nearly abut the thicker end of the regulating flap when the shutoff element shuts off the corresponding partial air flow. Preferably, both shutoff elements are configured in such a way in order to shut off each one of the partial air flows separately or to shut off both partial air flows simultaneously.

For example, the thicker end may be formed with a circular cross-section with the first pivot axis at its center, such that a distance between the housing and the thicker end of the regulating flap remains constant when the regulating flap is pivoted. This allows for an advantageous placement of said shutoff element, wherein the shutoff position remains shut independent of the position of the regulating flap.

The air vent may further comprise at least one directional vane pivotably arranged at least partly within the first air channel and/or the second air channel, the at least one directional vane being pivotable around an axis that is perpendicular to the first pivot axis and configured to regulate a direction of the first and/or second partial air flow.

The at least one directional vane may be pivotable to direct the net discharge air flow through the air outlet in a third direction and a fourth direction which are different from the first and second direction.

Depending on the positions of the first and second shutoff element, the at least one directional vane may be placed in a different part of (for example) the first and/or second air channel, thus permitting a highly efficient use of space within the air vent while providing full air flow guiding and regulating capabilities.

The air vent may comprise at least one manipulator configured to allow a user to regulate the air flow rate and/or directionality, enabling convenient operation of the air vent. The manipulator may be operated manually or via an actuator, for example a motor.

The air vent may be configured to be disposed in a motor vehicle, where all of its advantages readily take effect.

BRIEF DESCRIPTION OF THE FIGURES

The above, as well as other advantages of the proposed air vent, will become apparent to those skilled in the art from the following detailed description of certain embodiments of the air vent when considered in the light of the accompanying drawing (FIG. 1).

FIG. 1 shows schematically a cross-section of an air vent according to an illustrative example.

DETAILED DESCRIPTION

The air vent 1 shown in FIG. 1 comprises a housing 2 configured to guide an air flow from an air inlet 3 to an air outlet 4, an air guide 5 arranged mostly within the housing 2 such that the air guide 5 and the housing 2 define a first air channel 6 and a second air channel 7, a regulating flap 8 arranged between the air inlet 3 and the air guide 5, configured to pivot around a first pivot axis 9 to regulate a ratio between a first partial air flow through the first air channel 6 and a second partial air flow through the second air channel 7, a first shutoff element 10 arranged within the housing 2, and a second shutoff element 11 arranged within the housing 2. The first and second air channel 6 and 7 also include spaces between the housing and the regulating flap 8.

The first channel 6 and the second channel 7 are configured such that an air flow leaving the first channel 6 will collide with an air flow leaving the second channel 7. The larger the ratio between the first partial air flow and the second partial air flow, the more the resulting air flow into the vehicle interior will be determined by the direction of the first partial air flow, i.e. in the direction indicated with the arrow 17.

The housing 2, air guide 5, regulating flap 8, first shutoff element 10, and second shutoff element 11 are composed of rigid plastic materials, but may also be composed of or comprise other materials, such as metals. The regulating flap 8 may comprise a soft or compressible material at the end parts that abut the housing 2 on closing a channel to achieve proper sealing.

The first shutoff element 10 is configured to shut off only the first partial air flow without shutting off the second partial air flow and the second shutoff element 11 is configured to shut off only the second partial air flow without shutting off the first partial air flow.

The interior of the housing 2 defines a cavity 12. The air inlet 3 and the air outlet 4 are openings in the housing configured to fluidly connect the cavity 12 with surrounding air. The air inlet and the air outlet are nearly diametrical with respect to one another. As the pictured housing 2 deviates slightly from a mirror symmetric arrangement, a central axis 13 is as an axis extending approximately through the center of the housing 2 from the air inlet 3 to the air outlet 4. Other arrangements, including a symmetric arrangement of the housing 2, are possible. A direction parallel to the central axis 13 is referred to as the axial direction.

The air vent 1 is configured to be disposed in a motor vehicle. The air inlet 3 is connectable to an air duct of an HVAC (heating and/or ventilation and/or air conditioning) system of a motor vehicle, configured to cause an air flow through the cavity 12 by being fluidly connected to a central unit of the HVAC system.

The air outlet 4 is configured to allow for the cavity 12 to be fluidly connected with an interior space of the motor vehicle. The air outlet 4 is configured to allow for a discharge of the air flow into the interior space when the air inlet 3 is connected to the air duct.

The air guide 5 is a rigid body mounted in a fixed position with respect to the housing 2, located centrally in the housing 2 near the air outlet 4 and mostly contained within the cavity 12. In other examples, it may protrude substantially from the cavity 12 or be fully contained within the cavity 12. Spaces between the housing 2 and the air guide 5 on opposite sides of the air guide 5 define the first air channel 6 and the second air channel 7. A plane containing the central axis and arranged such that it lies substantially between the first air channel and the second air channel is referred to as a central plane.

The regulating flap 8 is a rigid body mounted pivotably (around the first pivot axis 9) between the air inlet 3 and the air guide 5. The first pivot axis 9 lies within the central plane and is perpendicular to the central axis.

The regulating flap 8 is configured to regulate the ratio between the first partial air flow and the second partial air flow by pivoting towards directions perpendicular to the central plane such that one of the first and second air channel 6 and 7 are at least partially obstructed when viewed from the air inlet 3. The regulating flap is configured to pivot to a first extreme position 14 (dashed outlines), in which the first air channel 6 is fully obstructed, and to a second extreme position 15 (dashed outlines), in which the second air channel 7 is fully obstructed.

The regulating flap 8 is configured to be pivotable to a neutral position 16 (solid outlines), in which it is aligned nearly along the axial direction 13 such that the first partial air flow and the second partial air flow are equal, i.e. have equal flow rates.

The first air channel 6 is configured to guide the first partial air flow such that it is discharged through the air outlet 4 towards a first direction 17; the second air channel 7 is configured to guide the second partial air flow such that it is discharged through the air outlet 4 towards a second direction 18 opposite the first direction. Regulating the fractions of the air flow that make up the first and/or second partial air flow therefore regulates a net discharge direction of the air flow discharged through the air outlet 4.

The first and second shutoff element 10 and 11 are movable elements configured to be movable to a shutoff position 19 (dashed lines), in which the respective partial air flow is shut off, and an open position 20, in which the respective partial air flow is maximal. In addition, the first and second shutoff element 10 and 11 are configured to regulate the flow rate of the first and second partial air flow, respectively, to assume different intermediate values by moving the shutoff element to positions between the shutoff position 19 and the open position 20. The first and second shutoff element 10 and 11 move jointly such that the first and second partial air flow are regulated jointly. In different examples, they may move independently.

The first shutoff element 10 is arranges within the first air channel 6. The second shutoff element 11 is arranged within the second air channel 7. Different placements are possible, for instance, wherein the shutoff element 10 and 11 are only partially arranged within the respective air channels 6 and 7.

The first and second shutoff elements 10 and 11 are formed as pivotable vanes, the first shutoff element 10 being pivotable around a second pivot axis 21 and the second shutoff 11 element being pivotable around a third pivot axis 22.

The pivotable vanes making up the shutoff element 10 and 11 are flat, rigid bodies. The second and third pivot axes 21 and 22 are spindles that traverse the housing 2, with both end portions of each spindle being affixed to the housing 2 and a center portion of the corresponding shutoff element 10 or 11 pivotably mounted thereto. Alternatively, at least one of the second or third pivot axis 21 and 22 may be a hinge-like structure arranged at a wall of the housing, at the air guide, at the regulating flap, or elsewhere at a rigid part of the housing, with an end portion of the corresponding shutoff element pivotably mounted to the pivot axis.

The second pivot axis 21 is parallel to the third pivot axis 22 and the first pivot axis 9 is parallel to the second an third pivot axis 21 and 22. In alternative examples, different angles between the pivot axes 9, 21, and 22 may be implemented.

Alternatively to being pivotable vanes, the first and second shutoff elements 10 and 11 may be other types of shutoff elements, e.g. sliding or bending closure elements. At least one of the shutoff elements 10 and 11 may comprise more than one vane, for instance, at least one of the shutoff elements 10 and 11 may comprise a plurality of pivotable vanes configured to pivot jointly.

Each of the shutoff elements 10 and 11 has a first length 23 along the axial direction, the air guide 5 has a second length 24 along the axial direction, and the regulating flap 8 has a third length 25 along the axial direction. The first length 23 is less than about one third of each of the second length 24 and the third length 25. Each of the shutoff elements 10 and 11 partially overlaps the regulating flap 8 and the air guide 5 along the axial direction, though approximately 90% of the length 23 of the shutoff elements 10 and 11 overlaps the regulating flap 8.

In certain examples, different relative lengths 23, 24 and/or 25 or different relative positions of the shutoff elements 10 and 11, the air guide 5 and the regulating flap 8 can be chosen. For example, the first length 23 may be less than two thirds of the second or third length 24 or 25 or less than half of the second or third length 24 or 25 and/or more than half of the length 23 of the shutoff element 10 and 11 may overlap the air guide 5.

The regulating flap 8 has a tapered shape with a thicker end 26 oriented towards the air guide 5. The thicker end 26 is formed with a circular cross-section with the first pivot axis 9 at its center, such that a distance between the housing 2 and the thicker end 26 of the regulating flap 8 remains constant when the regulating flap 8 is pivoted. In this way, the shutoff elements 10 and 11 are configured to abut the thicker end 26 of the regulating flap 8 when the shutoff elements 10 and 11 shut off the corresponding partial air flow (shutoff position 19). The regulating flap 8 may alternatively have different shapes, for instance, it may be formed as a flat pivotable vane.

The air vent 1 further comprises two sets of directional vanes 27 pivotably arranged within the housing 2, overlapping the air guide 5 along the axial direction, and configured to regulate a direction of the first and second partial air flow. Each set of directional vanes 27 contains a plurality of directional vanes 27; one set is arranged within each of the first and second air flow channels 6 and 7. The directional vanes 27 are pivotable to direct the net discharge air flow through the air outlet 4 in a third direction 28 and a fourth direction 29 which are perpendicular to the first and second direction 17 and 18.

The directional vanes 27 are optional, i.e. they may be omitted in certain examples or replaced with other types of air regulating elements known in the art. The directional vanes 27 may also be arranged in different parts of the housing 2, e.g. overlapping the regulating flap 8 in the axial direction (especially in cases where the shutoff elements 10 and 11 are arranged e.g. overlapping the air guide 5 in the axial direction).

The air vent comprises a first manipulator 30 configured to allow a user to regulate the air flow rate directionality by regulating the positions of the regulating flap 8 and directional vanes 27.

A second manipulator (not shown) regulates the position of the first and second shutoff element 10 and 11. Alternatively, a single manipulator could be provided, configured to regulate all of the air regulating components (shutoff elements 10 and 11, regulating flap 8, directional vanes 27).

LIST OF REFERENCE NUMERALS

1 Air vent
2 Housing
3 Air inlet
4 Air outlet
5 Air guide
6 First air channel
7 Second air channel
8 Regulating flap
9 First pivot axis
10 First shutoff element
11 Second shutoff element
12 Cavity
13 Central axis
14 First extreme position
15 Second extreme position
16 Neutral position
17 First direction
18 Second direction
19 Shutoff position
20 Open position
21 Second pivot axis
22 Third pivot axis
23 First length
24 Second length
25 Third length
26 Thicker end
27 Directional vanes
28 Third direction
29 Fourth direction
30 Manipulator

The invention claimed is:

1. An air vent, comprising:
a housing configured to guide an air flow from an air inlet to an air outlet;
an air guide arranged at least partly within the housing such that the air guide and the housing define a first air channel and a second air channel;
a regulating flap arranged between the air inlet and the air guide, the regulating flap configured to pivot around a first pivot axis to regulate a ratio between a first partial air flow through the first air channel and a second partial air flow through the second air channel, the air guide mounted in a fixed position with respect to the housing;
a first shutoff element arranged at least partly within the housing and configured to shut off the first partial air flow without the first shutoff element shutting off the second partial air flow; and
a second shutoff element arranged at least partly within the housing and configured to shut off the second partial air flow without the second shutoff element shutting off the first partial air flow.

2. The air vent according to claim 1, wherein the first shutoff element is arranged at least partly within the first air channel and the second shutoff element is arranged at least partly within the second air channel.

3. The air vent according to claim 1, wherein the first shutoff element and the second shutoff element include pivotable vanes, the first shutoff element being pivotable around a second pivot axis and the second shutoff element being pivotable around a third pivot axis.

4. The air vent according to claim 3, wherein the second pivot axis is parallel to the third pivot axis.

5. The air vent according to claim 3, wherein the first pivot axis is parallel to at least one of the second or third pivot axis.

6. The air vent according to claim 5, wherein the first pivot axis, the second pivot axis, and the third pivot axis are parallel such that a straight line perpendicular to the first pivot axis crosses both the second pivot axis and the third pivot axis.

7. The air vent according to claim 3, wherein at least one of the pivotable vanes has a first length perpendicular to its pivot axis, wherein the air guide has a second length along an axial direction of the housing, wherein the regulating flap has a third length perpendicular to the first pivot axis, and wherein the first length is less than at least one of the second length or the third length.

8. The air vent according to claim 1, wherein the regulating flap has a tapered shape with a thicker end oriented towards the air guide.

9. The air vent according to claim 8, wherein at least one of the first shutoff element or the second shutoff element is configured to abut the thicker end of the regulating flap when the at least one of the first shutoff element shuts off the first partial air flow or the second shut off element shuts off the second partial air flow.

10. The air vent according to claim 1, further comprising:
at least one directional vane pivotably arranged at least partly within at least one of the first air channel or the second air channel, the at least one directional vane being pivotable around an axis that is perpendicular to the first pivot axis and configured to regulate a direction of at least one of the first partial air flow or the second partial air flow.

11. An air vent, comprising:
a housing configured to guide an air flow from an air inlet to an air outlet;
an air guide arranged at least partially within the housing such that the air guide and the housing define a first air channel and a second air channel;
a regulating flap arranged between the air inlet and the air guide, the regulating flap configured to pivot around a first pivot axis and to regulate a ratio between a first partial air flow through the first air channel and a second partial air flow through the second air channel, the air guide mounted in a fixed position with respect to the housing;
a first shutoff element arranged at least partially within the housing and configured to shut off the first partial air flow without the first shutoff element shutting off the second partial air flow, wherein the first shutoff element is arranged at least partially within the first air channel; and
a second shutoff element arranged at least partially within the housing and configured to shut off the second partial air flow without the second shutoff element shutting off the first partial air flow, wherein the second shut off element is arranged at least partially within the second air channel.

12. The air vent of claim 11, wherein the first shutoff element and the second shutoff element include pivotable vanes, the first shutoff element being pivotable around a second pivot axis and the second shutoff element being pivotable around a third pivot axis.

13. The air vent of claim 12, wherein the second pivot axis is parallel to the third pivot axis.

14. The air vent of claim 12, wherein the first pivot axis is parallel to at least one of the second pivot axis or third pivot axis.

15. The air vent according to claim 14, wherein the first pivot axis, the second pivot axis, and the third pivot axis are parallel such that a straight line perpendicular to the first pivot axis crosses both the second pivot axis and the third pivot axis.

16. An air vent, comprising:
a housing configured to guide an air flow from an air inlet to an air outlet;
an air guide arranged at least partially within the housing such that the air guide and the housing define a first air channel and a second air channel;
a regulating flap arranged between the air inlet and the air guide, the regulating flap configured to pivot around a first pivot axis and to regulate a ratio between a first partial air flow through the first air channel and a second partial air flow through the second air channel, the air guide mounted in a fixed position with respect to the housing, wherein the air regulating flap has a tapered shape with a thicker end oriented toward the air guide;
a first shutoff element arranged at least partially within the housing and configured to shut off the first partial air flow without the first shutoff element shutting off the second partial air flow, wherein the first shutoff element is arranged at least partially within the first air channel; and
a second shutoff element arranged at least partially within the housing and configured to shut off the second partial air flow without the second shutoff element shutting off the first partial air flow, wherein the second shut off element is arranged at least partially within the second air channel.

17. The air vent of claim 16, wherein the first shutoff element and the second shutoff element include pivotable vanes, the first shutoff element being pivotable around a second pivot axis and the second shutoff element being pivotable around a third pivot axis.

18. The air vent of claim 17, wherein the second pivot axis is parallel to the third pivot axis and wherein the first pivot axis is parallel to at least one of the second pivot axis or the third pivot axis.

19. The air vent of claim 17, wherein at least one of the first shutoff element or the second shutoff element is configured to abut the thicker end of the regulating flap when the at least one of the first shutoff element shuts off the first partial air flow or the second shut off element shuts off the second partial air flow.

20. The air vent of claim 16, further comprising:
at least one directional vane pivotably arranged at least partly within at least one of the first air channel or the second air channel, the at least one directional vane being pivotable around an axis that is perpendicular to the first pivot axis and configured to regulate a direction of at least one of the first partial air flow or the second partial air flow.

* * * * *